US 12,453,947 B2

United States Patent
Mesona et al.

(10) Patent No.: US 12,453,947 B2
(45) Date of Patent: Oct. 28, 2025

(54) REACTOR FOR HYDROLYSIS OF URANIUM HEXAFLUORIDE

(71) Applicant: FRAMATOME, Courbevoie (FR)

(72) Inventors: Bruno Mesona, Saint Marcel Les Valence (FR); Patrick Paillou, Romans (FR)

(73) Assignee: FRAMATOME, Courbevoie (FR)

( * ) Notice: Subject to any disclaimer, the term of this patent is extended or adjusted under 35 U.S.C. 154(b) by 835 days.

(21) Appl. No.: 17/777,031

(22) PCT Filed: Nov. 13, 2020

(86) PCT No.: PCT/EP2020/082122
§ 371 (c)(1),
(2) Date: May 14, 2022

(87) PCT Pub. No.: WO2021/094575
PCT Pub. Date: May 20, 2021

(65) Prior Publication Data
US 2023/0321621 A1    Oct. 12, 2023

(30) Foreign Application Priority Data

Nov. 15, 2019 (FR) ...................................... 19 12785

(51) Int. Cl.
*B01J 19/26*     (2006.01)
*B01J 4/00*      (2006.01)
*C01G 43/025*    (2006.01)

(52) U.S. Cl.
CPC .............. *B01J 4/002* (2013.01); *B01J 19/26* (2013.01); *C01G 43/025* (2013.01); *B01J 2204/002* (2013.01)

(58) Field of Classification Search
CPC ...... B01J 4/002; B01J 19/26; B01J 2204/002; C01G 43/025; C01G 43/01; C01G 43/06
USPC ........................................................... 422/162
See application file for complete search history.

(56) References Cited

U.S. PATENT DOCUMENTS

| 4,031,029 | A | * | 6/1977 | Colter | C01G 43/025 423/19 |
| 6,136,285 | A | * | 10/2000 | Feugier | G21C 19/48 422/142 |
| 2017/0348721 | A1 | | 12/2017 | Kalsi | |
| 2018/0141059 | A1 | | 5/2018 | Beatty et al. | |

FOREIGN PATENT DOCUMENTS

| CN | 1244178 A | 2/2000 |
| CN | 109505708 A | 3/2019 |
| CN | 109562339 A | 4/2019 |
| WO | WO9928236 A1 | 6/1999 |
| WO | WO2017212224 A1 | 12/2017 |

OTHER PUBLICATIONS

Corresponding Search Report for PCT/EP2020/082122.
Corresponding Search Report for FR 1912785.

* cited by examiner

*Primary Examiner* — Huy Tram Nguyen
(74) *Attorney, Agent, or Firm* — Davidson Kappel LLC

(57) ABSTRACT

A reactor (1) for hydrolysis of uranium hexafluoride comprises a tubular injector (9) comprising first (11), second (13) and third (15) concentric fluid circulation ducts intended to be connected respectively with a source of $UF_6$, a source of inert gas and a source of water vapor. The tubular injector (9) is obtained by additive manufacturing.

9 Claims, 5 Drawing Sheets

REACTOR FOR HYDROLYSIS OF URANIUM HEXAFLUORIDE

The present disclosure relates generally to uranium hexafluoride hydrolysis reactors.

BACKGROUND

WO 99/28236 discloses an example of a known uranium hexafluoride hydrolysis reactor, comprising:
- a hydrolysis chamber, comprising a wall delimiting an internal volume;
- a tubular injector comprising first, second and third concentric fluid circulation ducts mounted through the wall of the hydrolysis chamber.

The tubular injector presents an inner end located within the internal volume and an outer end located outside the internal volume. The first, second and third ducts are connected to a source of uranium hexafluoride ($UF_6$), a source of inert gas and a source of water vapor, respectively.

The tubular injector is a critical part for the operation of the hydrolysis reactor.

These tubular injectors must be replaced periodically. It has been observed that current tubular injectors may present quality defects and do not allow proper operation of the hydrolysis reactor.

Furthermore, in a plant comprising several hydrolysis reactors, it has been observed that it is difficult to use a tubular injector mounted on one hydrolysis reactor in another hydrolysis reactor.

SUMMARY

In this context, the present disclosure aims to provide a hydrolysis reactor the tubular injector of which does not have the above defect.

To this end, the present disclosure relates to a uranium hexafluoride hydrolysis reactor, comprising:
- a hydrolysis chamber, comprising a wall delimiting an internal volume;
- a tubular injector comprising first, second and third concentric fluid circulation ducts, the tubular injector being mounted through the wall of the hydrolysis chamber and presenting an inner end located within the internal volume and an outer end located outside the internal volume;

wherein:
- the first, second and third ducts present at the inner end of the first, second and third internal openings respectively leading into the internal volume;
- the tubular injector includes, at the outer end, first, second and third fittings fluidically connected to the first, second and third ducts respectively and intended for connecting to a source of $UF_6$, a source of inert gas and a source of water vapor respectively; and
- the tubular injector is obtained by additive manufacturing.

The reactor may further present one or more of the following features, considered individually or in any technically feasible combination:
- the second duct extends around the first duct, and the third duct extends around the second duct;
- the first, second and third ducts, at the outer end, extend according to a longitudinal direction, the first fitting extending longitudinally, the second and third fittings each forming an angle between 30° and 90° with the longitudinal direction;
- the second and third fittings are located at substantially the same level following the longitudinal direction;
- the tubular injector includes a sleeve with a central longitudinal axis, arranged around the outer end, a flange for fixing the tubular injector to the wall of the hydrolysis chamber being fitted to the sleeve;
- the tubular injector presents oval external sections over at least a portion of its length;
- the tubular injector presents first and second internal tubular walls delimiting the first duct and the second duct, respectively, said first and second internal tubular walls presenting oval cross-sections over at least a portion of the length of the tubular injector;
- the tubular injector presents a first rectilinear end section defining the inner end, a second rectilinear end section defining the outer end, and an intermediate curved section presenting said oval outer sections;
- the tubular injector has a stiffening rib along the curved intermediate section.

BRIEF SUMMARY OF THE DRAWINGS

Further features and advantages of the present disclosure will be apparent from the detailed description given below, by way of indication and not in any way limiting, with reference to the appended figures, of which.

DETAILED DESCRIPTION

The direct dry conversion of $UF_6$ to uranium oxide has been used industrially for a long time. The industrial implementation equipment generally comprises, successively:
- a reactor equipped with a means for introducing $UF_6$ and water vapor, intended to provoke the formation of $UO_2F_2$ by hydrolysis;
- a rotating tubular pyrohydrolysis furnace intended to transform the $UO_2F_2$ into uranium oxide, provided with a means for heating and a means for introducing water vapor and hydrogen in countercurrent; and
- a means for conditioning the oxide powder.

The chemical reactions implemented are the following:

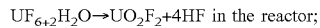

$UF_6 + 2H_2O \rightarrow UO_2F_2 + 4HF$ in the reactor;

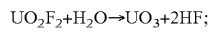

$UO_2F_2 + H_2O \rightarrow UO_3 + 2HF$;

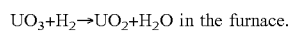

$UO_3 + H_2 \rightarrow UO_2 + H_2O$ in the furnace.

Figure 1:
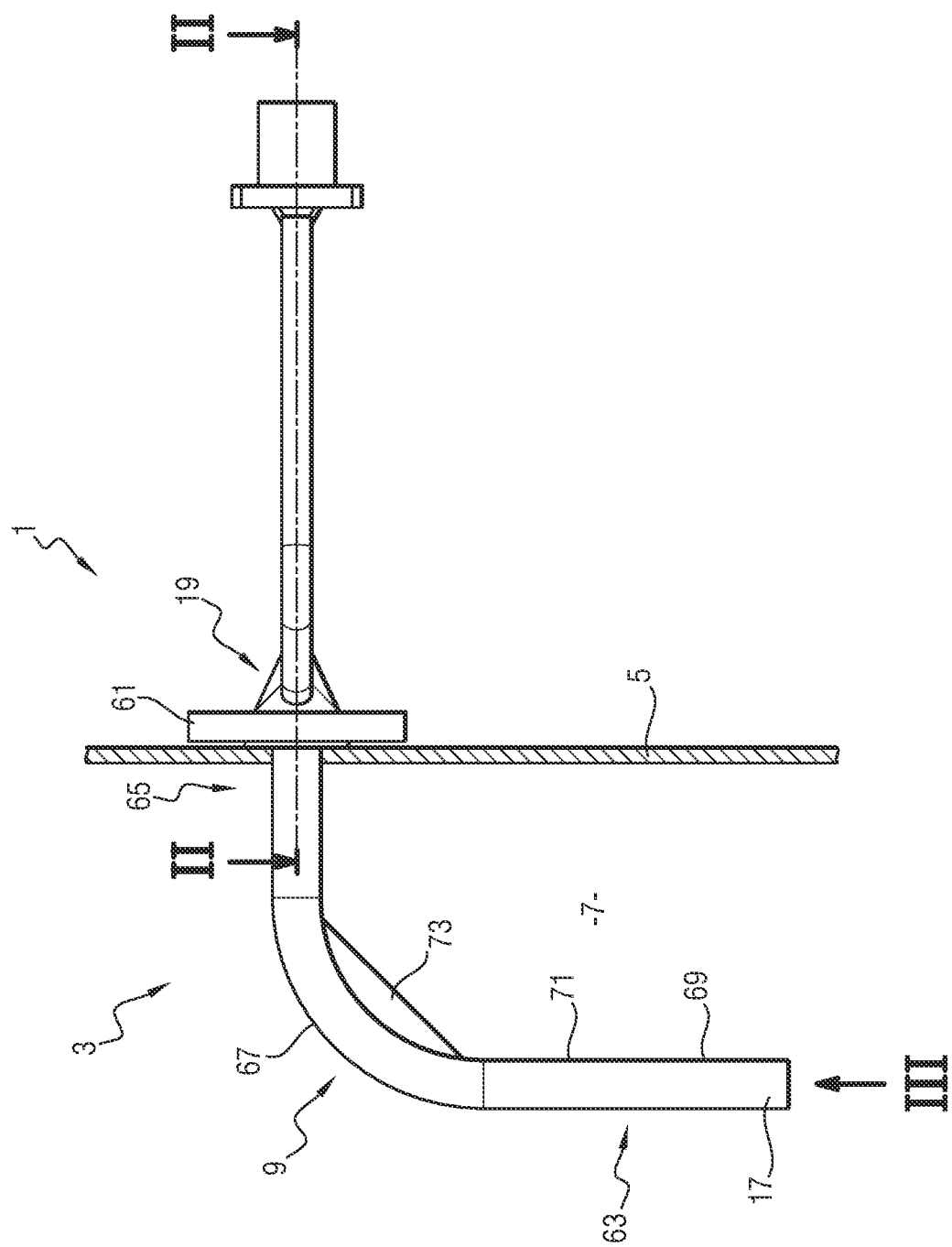
FIG. 1 is a partial side view of an example of a hydrolysis reactor according to the present disclosure.

The reactor 1 partially represented in FIG. 1 is intended to implement the first step, in other words, the hydrolysis of uranium hexafluoride $UF_6$ into $UO_2F_2$.

This reactor 1 comprises a hydrolysis chamber 3, with a wall 5 delimiting an internal volume 7.

The hydrolysis reactor 1 also includes a tubular injector 9, comprising first, second and third concentric fluid circulation ducts (see FIGS. 2 to 5). As seen in FIG. 1, the tubular injector 9 is mounted through the wall 5 of the hydrolysis chamber 3 and presents an inner end 17 located within the internal volume 7, and an outer end 19 located outside the internal volume 7.

The first, second and third ducts 11, 13, 15 present at their inner ends respectively first, second and third internal openings 21, 23, 25 (FIG. 3) opening into the internal volume 7.

The tubular injector 9 includes, at its outer end 19, first, second and third connectors 27, 29, 31 (see FIGS. 2 and 5) fluidically connected to the first, second and third ducts 11, 13, 15 respectively.

The first, second and third fittings 27, 29, 31 are intended to be connected respectively with a source 33 of $UF_6$, a source of inert gas 35 and a source of water vapor 37.

Figure 2:
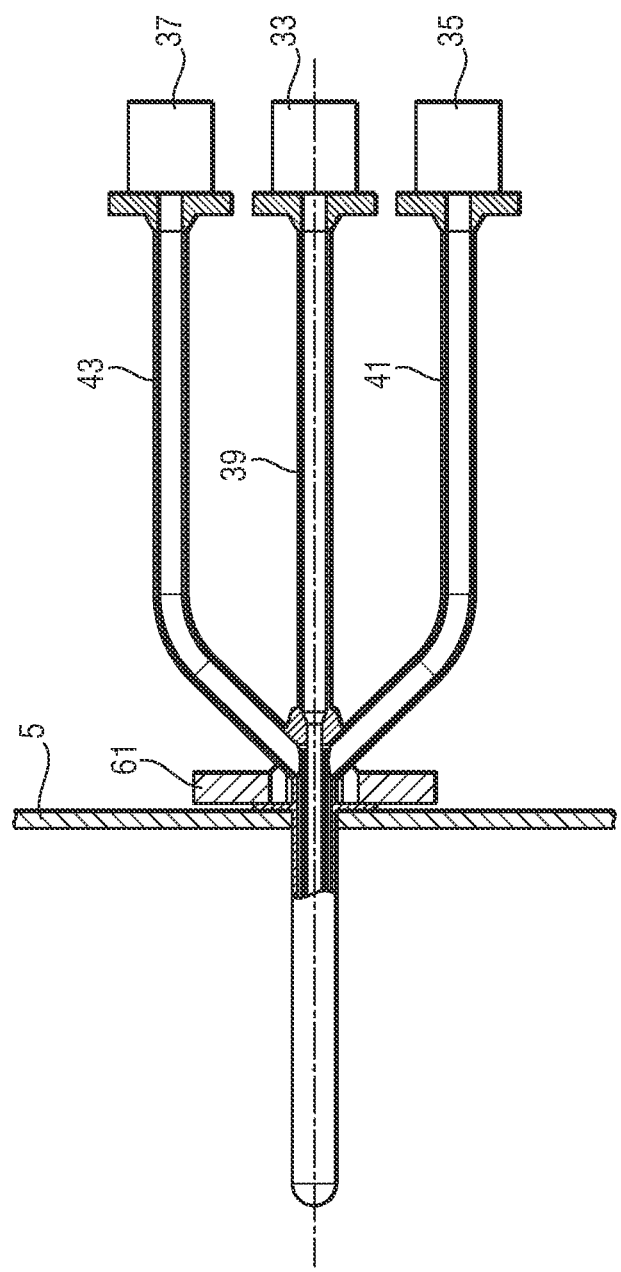
FIG. 2 is a top view of the tubular injector of FIG. 1.
Figure 3:
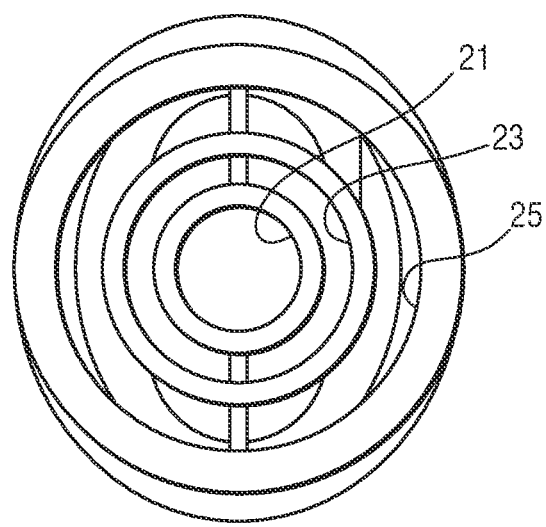
FIG. 3 is a view of the inner end of the tubular injector of FIGS. 1 and 2, taken according to the incidence of arrow III of FIG. 1.

These sources 33, 35, 37 are represented symbolically in FIG. 2.

In the example represented, the first, second and third fittings 27, 29, 31 are connected to the sources 33, 35, 37 by connecting the tubes referenced 39, 41, 43, respectively. These tubes are welded to the fittings 27, 29, 31, respectively, and attached by a flanged connection to the sources 33, 35, 37.

The reactor 1 is typically contained within a heated box, not shown, made of a thermally insulating material. Inside this box are placed heating resistors, not shown.

The $UF_6$ is injected into the hydrolysis chamber 3 in gaseous form.

After the hydrolysis reaction, it is transformed into $UO_2F_2$, which presents in the form of fine particles. These particles are collected by gravity at the bottom of the hydrolysis chamber 3 and transferred to the tubular furnace where the transformation of the $UO_2F_2$ into uranium oxide takes place.

For example, this transfer is carried out by means of a screw.

As seen in FIGS. 2 to 5, the second duct 13 extends around the first duct 11, and the third duct 15 extends around the second duct 13.

In other words, the ducts are arranged so that the first duct extends to the center of the tubular injector, the third duct to the outside of the tubular injector, with the second duct interposed between the first duct and the third duct.

To this end, the tubular injector presents first and second internal tubular walls 45, 47, delimiting the first duct 11 and the second duct 13 respectively. An outer wall 49 defines the outer surface of the tubular injector. The first internal wall separates the first duct 11 from the second duct 13. The second inner wall 47 separates the second duct 13 from the third duct 15. The outer wall 49 closes the third duct radially outwards.

Spacers, not shown, are placed in the second duct 13 and in the third duct 15, so as to maintain a constant spacing between the first inner wall 45 and the second inner wall 47, and between the second inner wall 47 and the outer wall 49.

This maintains a constant cross-section along the second and third ducts 13, 15.

According to the present disclosure, the tubular injector 9 is obtained by additive manufacturing. This manufacturing method is also known as 3D printing.

The tubular injector is typically made of metal, for example inconel, or any other suitable material.

The tubular injector 9 is preferably made entirely by additive manufacturing.

In particular, the first and second internal walls 45, 47, the outer wall 49, the first, second and third fittings 27, 29, 31 are obtained by additive manufacturing.

Such a manufacturing method allows to guarantee an excellent manufacturing quality.

In particular, this makes it possible to obtain excellent concentricity, and thus an extremely uniform cross-section along the ducts 11, 13 and 15.

Due to the absence of welds between the parts delimiting the ducts, the pressure losses during the gas circulation along the ducts are extremely reduced. This leads to a better performance of the hydrolysis reactor.

Due to the additive manufacturing of the tubular injector, it is possible to obtain an excellent concentricity of the first, second and third ducts. As a result, it is not necessary to implant a large number of spacers between the inner walls 45, 47 and between the inner wall 47 and the outer end 19. This also helps to reduce pressure drop and to achieve reproducible operating characteristics. With the prior art tubular injectors, which were mechanically welded and not obtained by additive manufacturing, the pressure drop imposed on the gases circulating along the ducts varied from one tubular injector to another.

This explained in part that a tubular injector adapted to a given hydrolysis reactor could not be reused in another, different hydrolysis reactor.

Thus, the operating characteristics of the tubular injector, especially the pressure drop, are much more reproducible. As a result, a tubular injector used on a given hydrolysis reactor can be reused much more easily on another hydrolysis reactor.

Figure 5:
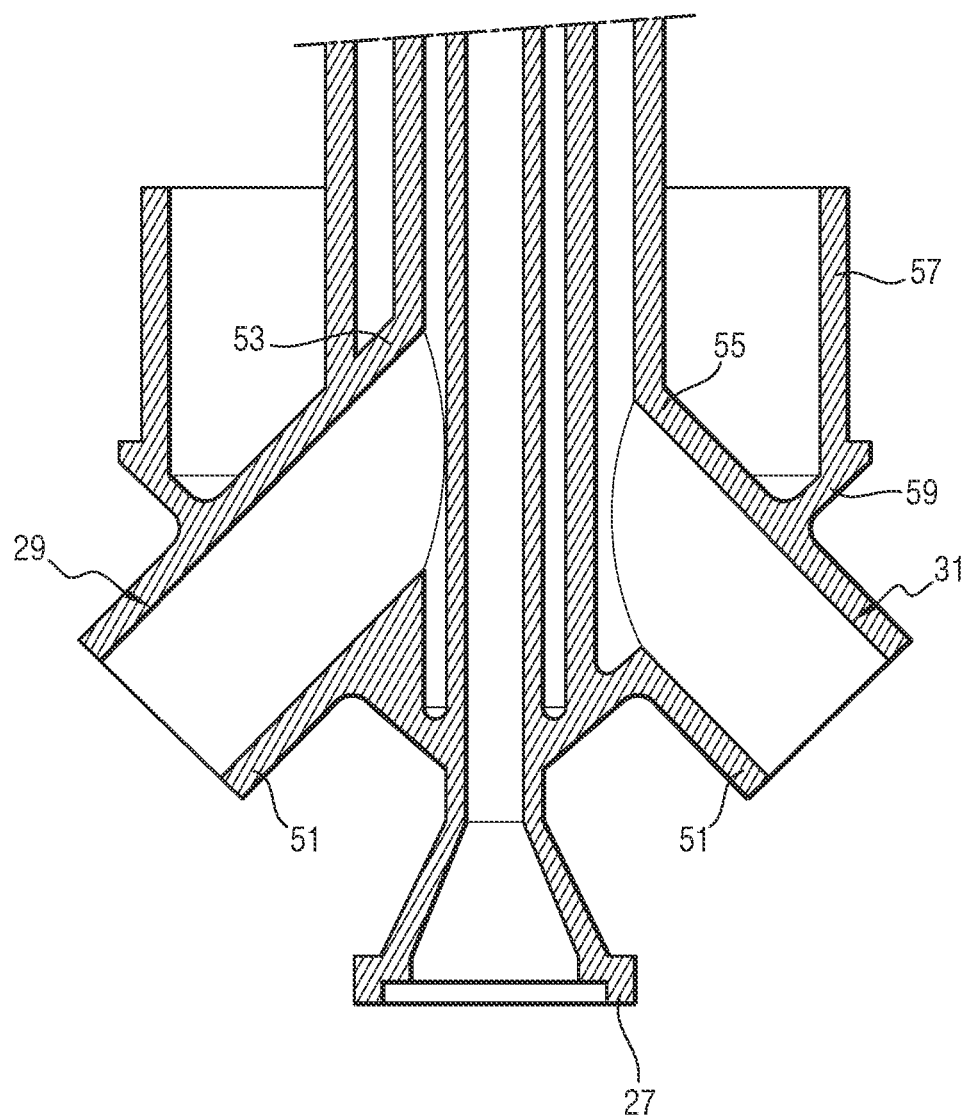
FIG. 5 is a longitudinal cross-sectional view of the outer end of the tubular injector in FIG. 4.

As seen particularly in FIG. 5, the first, second and third ducts 11, 13, 15 at the outer end 19 of the tubular injector, extend longitudinally.

The first fitting 27 also extends longitudinally along the outer end 19.

The second and third fittings 29, 31 each form an angle of between 30° and 90° with the longitudinal direction.

In the example shown, the second and third fittings 29, 31 form an angle of 45° with the longitudinal direction.

This angle is typically taken between the centerline axis of the inner duct of the fitting and the longitudinal direction.

The first, second and third fittings 27, 29, 31 are arranged substantially in the same plane, as can be seen by comparing FIGS. 1 and 2.

Advantageously, the second 29 and third 31 fittings are located at substantially the same level along the longitudinal direction.

The second and third fittings 29, 31 project laterally relative to the outer wall 49 of the tubular injector. They are located on either side of the first fitting 27.

Each of the second and third fittings 29, 31 presents the shape of a tube with an outer end portion 51 projecting relative to the outer wall 49.

The second fitting 29 presents an inner end portion 53 that extends through the third duct 15 and which opens into the second duct 13 through the second tubular wall 47.

The inner end portion 53 is integral with the second inner wall 47.

The third fitting 31 presents an end portion 55 that is integral with the outer wall 49. The inner duct of the third fitting communicates with the third duct 15 through the outer wall 49.

The second 29 and third 31 fittings are located at substantially the same level longitudinally in that the end portions 53 and 55 of the second and third fittings are located longitudinally at substantially the same level.

In other words, the openings in the second inner wall 47 and in the outer wall 49, respectively, and communicating the internal ducts of the fittings 29 and 31 with the second duct 13 and the third duct 15, are located longitudinally at substantially the same level.

This is particularly advantageous, as the design of the outer end 19 of the tubular injector is thereby particularly compact longitudinally. In the state of the art, the fittings are longitudinally offset relative to each other due to the mechanically welded construction of the tubular injector.

Having a more longitudinally compact design makes it easier to manufacture the tubular injector by additive manufacturing. A very large manufacturing tool is not required, and a more modest size is sufficient which saves cost.

The tubular injector 9 further includes a sleeve 57 with a central longitudinal axis, arranged around the outer end 19.

The sleeve 57 presents a generally cylindrical shape, with a circular section. A cone 59 extends the sleeve 57 longitudinally towards the first fitting 27. The cone 59 is integral with one of the closed contour edges of sleeve 57. It is also integral with the outer wall 49 and the second and third fittings 29, 31. The cone 59 is used to secure the sleeve 57 to the outer end 19.

The sleeve 57 and the cone 59 are part of the tubular injector and are also obtained by additive manufacturing.

As seen in FIGS. 1 and 2, a flange 61 for attaching the tubular injector 9 to the wall 5 of the hydrolysis chamber is attached to the sleeve 57.

The flange 61 fits on the outside of the sleeve 57, around it. It thus presents a central opening in which the flange 61 is engaged and is fixed to the sleeve 57 by any means, for example by stitch welding. The flange 61 is rigidly fixed to the wall 5 by any suitable means, for example screws.

Advantageously, the tubular injector presents oval outer sections over at least part of its length.

Typically, these oval sections are elliptical in shape.

As seen in FIG. 1, the tubular injector presents a first straight end section 63, defining the inner end 17.

The tubular injector 9 also presents a second straight end section 65, defining the outer end 19.

Between the first and second end sections, the tubular injector 9 presents an intermediate curved section 67.

For example, sections 63 and 65 are perpendicular to each other.

At least the curved intermediate section presents oval outer sections. In the illustrated example, the second end section 65 also presents oval outer sections.

In contrast, the first end section 63 includes a terminal portion 69 of circular cross-section, which defines the inner end 17, the first end section 63 further includes a connecting section 71, connecting the intermediate section 67 to the terminal portion 69. Along the connecting section 71, the outer section gradually changes from an oval shape to a circular shape. Along the parts of the tubular injector having an oval outer cross-section, the first and second inner tubular walls 45, 47 also present oval cross-sections.

The oval outer section of the tubular injector is defined by the outer wall.

It should be noted that the respective oval cross-sections of the first and second inner tubular walls 45, 47 and the outer wall 49 are parallel to each other. In other words, they are concentric. By this is meant that the geometric center of the ovals formed by the walls 45, 47 and the outer wall 49 are coincident.

Providing oval external sections facilitates additive manufacturing.

Figure 4:
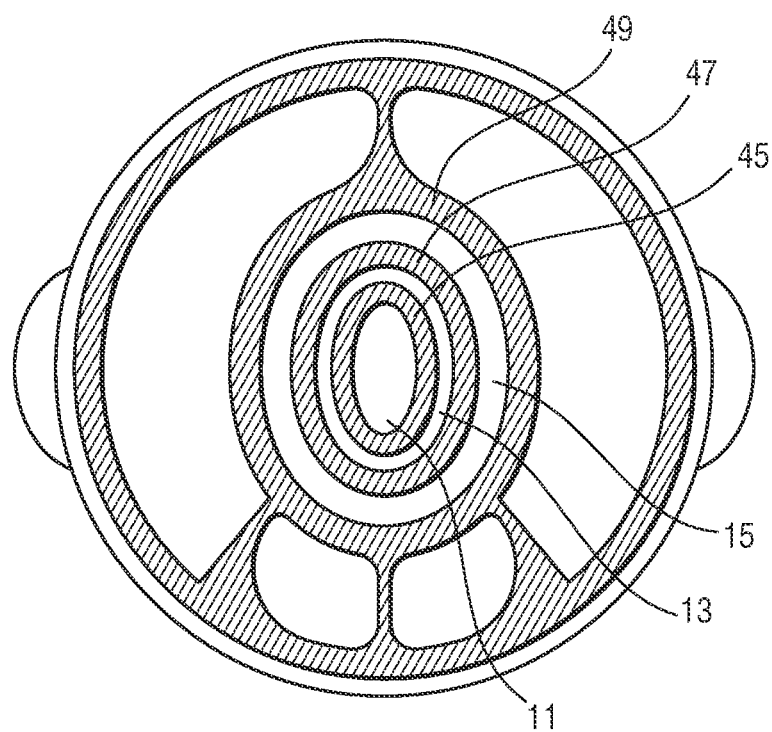
FIG. 4 is a cross-sectional view of the outer end of the tubular injector, taken according to the incidence of arrow IV in FIG. 5.

Indeed, the tubular injector is manufactured according to the orientation shown in FIG. 4, with the major axis of the oval oriented along the vertical direction.

When making the upper part of the section, the risk of collapse is reduced relative to the risk of collapse if the section is circular.

It should be noted that the tubular injector has a stiffening rib 73 along the curved intermediate section. This increases the rigidity of the tubular injector. As seen in FIG. 1, inside the hydrolysis reactor, the first end section is vertically oriented. The inner end points downward. The second end section is substantially horizontal in orientation.

What is claimed is:

1. A uranium hexafluoride hydrolysis reactor comprising:
   a hydrolysis chamber, comprising a wall delimiting an internal volume; and
   a tubular injector comprising first, second and third concentric fluid circulation ducts, the tubular injector being mounted through the wall of the hydrolysis chamber and presenting an inner end located in the internal volume and an outer end located outside the internal volume;
   the first, second and third ducts present at the inner end first, second and third internal openings respectively, opening into the internal volume;
   the tubular injector includes, at the outer end, first, second and third fittings fluidically connected respectively to the first, second and third ducts and configured to be connected respectively with a source of $UF_6$, a source of inert gas and a source of water vapor;
   the tubular injector being obtained by additive manufacturing,
   wherein the first, second, and third ducts at the outer end extend according to a longitudinal direction, the first fitting extending longitudinally, the second and third fittings each forming an angle of between 30° and 90° with the longitudinal direction;
   wherein the second and third fittings are located at substantially a same level along the longitudinal direction.

2. The reactor according to claim 1, wherein the second duct extends around the first duct, and the third duct extends around the second duct.

3. The reactor according to claim 1, wherein the tubular injector includes a sleeve with a central longitudinal axis, arranged around the outer end, a flange for fixing the tubular injector to the wall of the hydrolysis chamber being attached to the sleeve.

4. The reactor according to claim 1, wherein the tubular injector presents oval outer sections over at least a part of a length of the tubular injector.

5. The reactor according to claim 4, wherein the tubular injector presents first and second internal tubular walls delimiting the first duct and the second duct, respectively, said first and second internal tubular walls presenting oval cross-sections over at least a portion of the length of the tubular injector.

6. The reactor according to claim 4, wherein the tubular injector presents a first rectilinear end section defining the inner end, a second rectilinear end section defining the outer end, and a curved intermediate section presenting said oval outer sections.

7. The reactor according to claim 6, wherein the tubular injector has a stiffening rib along the curved intermediate section.

8. A uranium hexafluoride hydrolysis reactor comprising:
   a hydrolysis chamber, comprising a wall delimiting an internal volume; and
   a tubular injector comprising first, second and third concentric fluid circulation ducts, the tubular injector being mounted through the wall of the hydrolysis chamber and presenting an inner end located in the internal volume and an outer end located outside the internal volume;

the first, second and third ducts present at the inner end first, second and third internal openings respectively, opening into the internal volume;

the tubular injector includes, at the outer end, first, second and third fittings fluidically connected respectively to the first, second and third ducts and configured to be connected respectively with a source of $UF_6$, a source of inert gas and a source of water vapor;

the tubular injector being obtained by additive manufacturing;

wherein the first, second, and third ducts at the outer end extend according to a longitudinal direction, the first fitting extending longitudinally, the second and third fittings each forming an angle of between 30° and 90° with the longitudinal direction;

wherein the tubular injector includes a sleeve with a central longitudinal axis, arranged around the outer end, a flange for fixing the tubular injector to the wall of the hydrolysis chamber being attached to the sleeve.

9. A uranium hexafluoride hydrolysis reactor comprising:
a hydrolysis chamber, comprising a wall delimiting an internal volume; and
a tubular injector comprising first, second and third concentric fluid circulation ducts, the tubular injector being mounted through the wall of the hydrolysis chamber and presenting an inner end located in the internal volume and an outer end located outside the internal volume;
the first, second and third ducts present at the inner end first, second and third internal openings respectively, opening into the internal volume;
the tubular injector includes, at the outer end, first, second and third fittings fluidically connected respectively to the first, second and third ducts and configured to be connected respectively with a source of $UF_6$, a source of inert gas and a source of water vapor;
the tubular injector being obtained by additive manufacturing;
wherein the tubular injector presents oval outer sections over at least a part of a length of the tubular injector.

* * * * *